H. DUNDERDALE.

LADDER.

APPLICATION FILED MAR. 27, 1915.

Reissued May 11, 1915.

13,914.

2 SHEETS—SHEET 1.

Witnesses:
Robert F. Weir
Arthur W. Carlson

Inventor
Herbert Dunderdale
by Symonds & Bradley Lechner & Parker
Attys.

H. DUNDERDALE.

LADDER.

APPLICATION FILED MAR. 27, 1915.

Reissued May 11, 1915. 13,914.

2 SHEETS—SHEET 2.

Witnesses:
Robert F. Weir
Arthur W. Carlson

Inventor
Herbert Dunderdale
by Symmes Bradley Kenyon & Baker
Attys.

UNITED STATES PATENT OFFICE.

HERBERT DUNDERDALE, OF CLEVELAND, OHIO, ASSIGNOR TO CHICAGO STANDARD EQUIPMENT COMPANY, OF CHICAGO, ILLINOIS, A CORPORATION OF MAINE.

LADDER.

13,914. Specification of Reissued Letters Patent. Reissued May 11, 1915.

Original No. 1,118,404, dated November 24, 1914, Serial No. 834,903. Application for reissue filed March 27, 1915. Serial No. 17,552.

*To all whom it may concern:*

Be it known that I, HERBERT DUNDERDALE, a citizen of the United States, now residing at Cleveland, in the county of Cuyahoga and State of Ohio, have invented certain new and useful Improvements in Ladders, of which the following is a specification, reference being had to the accompanying drawings, forming a part hereof.

My invention relates generally to ladders, and has reference more particularly to those employed in connection with railway freight cars. One of the objects of my invention is to so construct the stiles and treads of a ladder that they may be easily and quickly assembled in locked relation without the employment of any fastening elements therebetween. Another object of my invention is to provide a ladder which can be assembled and applied to the car at a minimum cost.

A further object of my invention is to produce a ladder which is simple, practical, and rigid in construction; and a ladder capable of withstanding the hardest service usage, and wherein the rungs cannot turn in or become detached from their stiles.

These, together with such other objects as may hereinafter appear, or are incident to my invention, I obtain by means of a construction illustrated in preferred form in the accompanying drawings, wherein:—

In carrying out my invention I provide the stiles 9 preferably composed of angle irons, each having inner flanges $9^a$ and outer lateral flanges $9^b$. Both inner flanges $9^a$ of the stiles are arranged to constitute outer foot guards, and the lateral flanges $9^b$ are adapted to be fastened at their ends to the car siding 13 by the strap sections 11 indicated more clearly in Figure 3; the bolts 12 removably connecting the ladder to the strap sections, as in the manner therein shown.

Figure 1:
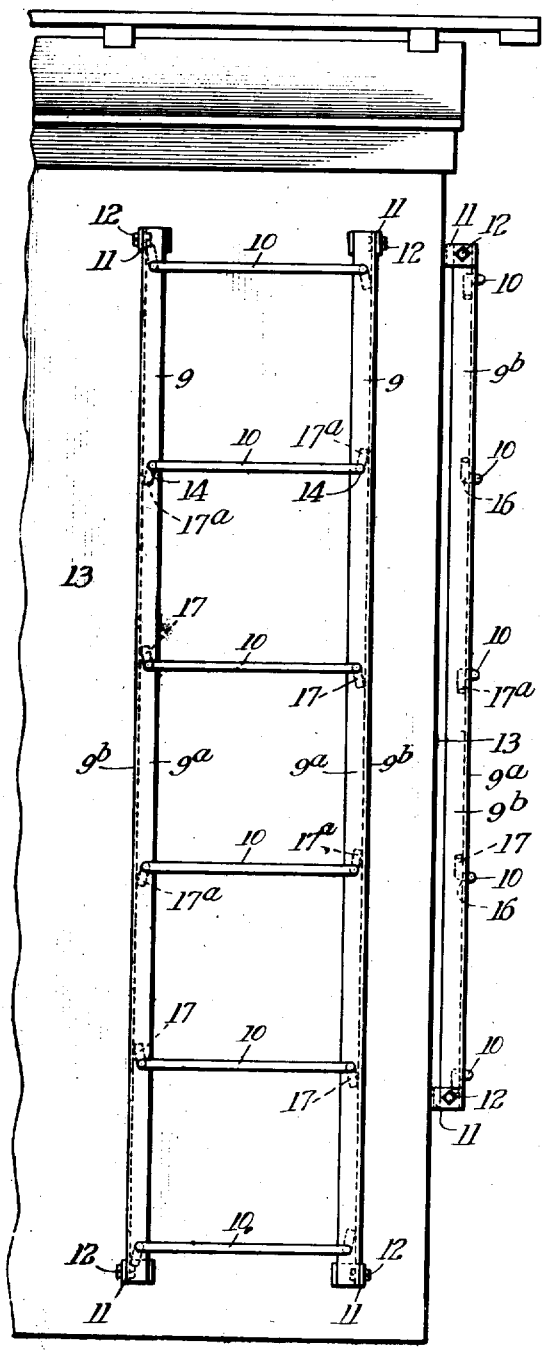
Figures 1 and 2 are front and side elevations, respectively, of a portion of a car showing the application of my improved ladder to both the side and end of the car.
Figure 2:
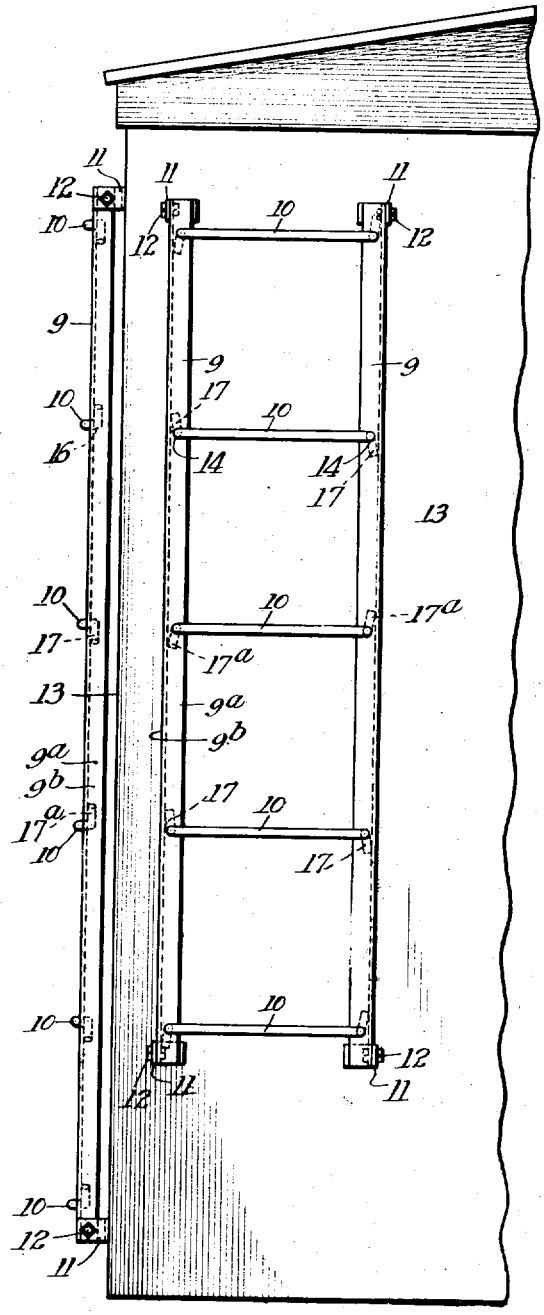
Figure 5:
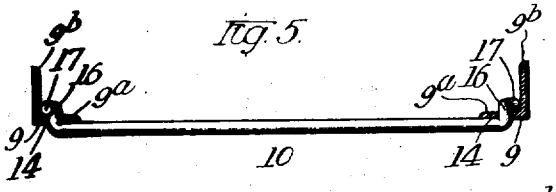
Figure 5 is an enlarged horizontal section taken through the ladder.
Figure 6:
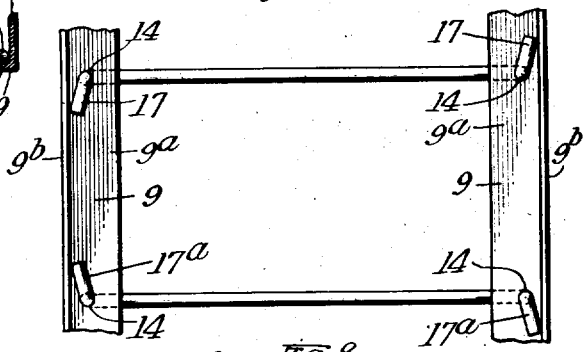
Figure 6 is a partial rear elevation of the treads as assembled.

A series of vertically alined holes 14 formed at intervals in the inner flange $9^a$ of the stiles to receive and provide a solid bearing for the series of rungs indicated at 10 in Figures 1 and 2. A reference to Figures 4, 5 and 6 will show that each of the rungs 10 comprises a tread portion 15 which is provided adjacent its ends with the angular offset portions 16 adapted to engage and rest in the holes 14 formed in the stiles, and whose end portions 17 are bent in a vertical direction away from the said offset portions and slightly incline outwardly to engage the face of the lateral stile flanges $9^b$ in a locking relation therewith. In this manner the rung 10 is positively locked against any turning movement whatsoever in the holes 14.

Figure 4:
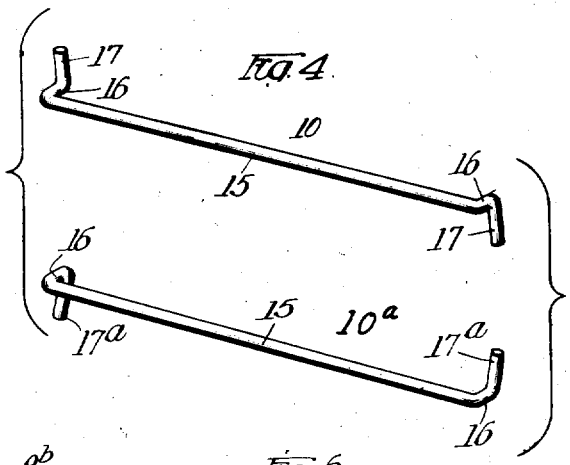
Figure 4 is a front perspective of a pair of the treads prior to their assemblage in the stiles.
Figure 8:
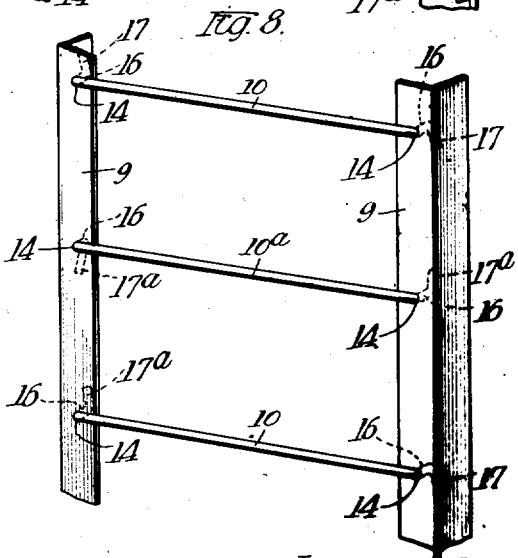

This statement of description refers generally to either of the two treads shown in Figure 4, the lower one of which $10^a$, however, has preferably each of its inclined end portions $17^a$ bent in a direction opposite to that of the corresponding bent portions 17 of the upper rung 10. When the rung $10^a$ is associated in the stiles with one or more of the rungs 10 to form the ladder, both stiles are consequently locked against relative vertical movement. In other words at a time prior to its application to the car the ladder possesses that degree of rigidity which permits its ready application thereto, and once applied is absolutely rigid in all respects. In practice the rung $10^a$ may be alternately arranged with the rungs 10 as indicated in Figure 8, or one or more of either of the rungs 10 or $10^a$ may be assembled with a series of the other of the rungs in any arrangement as may be considered expedient.

Figure 7:
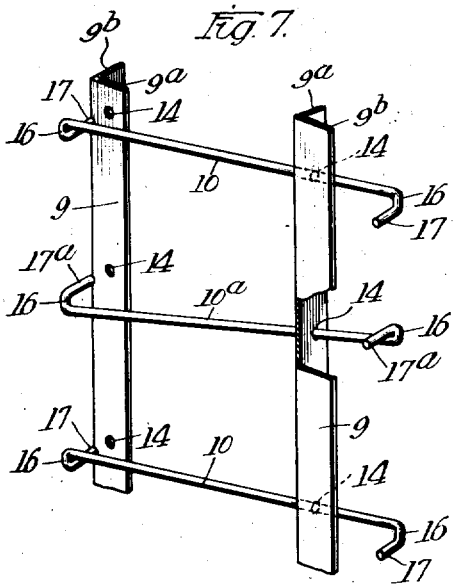
Figures 7 and 8 are views in perspective showing the method of assembling the ladder parts, and the parts as finally assembled in locked relation, respectively.

In order to apply the rungs to the stiles, the bent end portions of the rungs 10 and $10^a$ are passed through the openings 14 in one of the stiles 9 to project beyond the outer flange $9^b$, as in the manner shown in Figure 7, said projecting ends being turned so as to have the other end portions terminally register with the openings 14 in the other of the stiles to pass therethrough. The projecting bent ends are then each given a quarter turn to occupy a vertical position so that the other end portions which have passed through the holes 14 are correspondingly brought in place abutting against the outer flange $9^b$ of the stile, whereupon the first mentioned stile is moved outwardly along the rungs and turned inwardly to the position shown in Figure 8, which illustrates a portion of the complete ladder.

Figure 3:
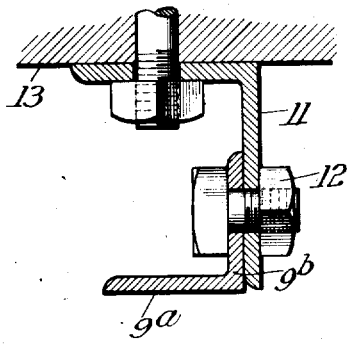
Figure 3 represents an enlarged detail view illustrating the means for attaching the ladder to the car.

While other commercial roller sections may be used instead of the angle irons shown, such as a channel iron which use is suggested in Figure 3, I prefer to use the angle irons, for in the event of any desired replacement of a rung, one of the stiles may be quickly uncoupled from its end straps by removing top and bottom bolts 12, which are conveniently placed for this reason, and then moved inwardly along the rungs toward the inner position indicated in Figure 7, so as to permit the removal of the rung and the replacement of another.

From the foregoing it will be obvious that the ladder may be easily and readily applied to the car, and is simple, economical and practical in its construction. Another important feature of my invention lies in the fact that the rungs cannot turn in and cannot come detached from the stiles. Other advantages will be apparent to those skilled in the art.

I do not intend to restrict myself to the precise details of construction or to the exact arrangement of the parts as shown, as it is obvious that variations therefrom may be made without departing from the spirit and scope of my invention, as more particularly pointed out in the appended claims.

Having thus described my invention and illustrated its use, what I claim as new and desire to secure by Letters Patent, is the following:—

1. A ladder comprising stiles and a plurality of detachable rungs, each stile having divergent flanges and formed with a hole in one of its flanges, said rungs having hole engaging portions and oppositely bent end portions each inclining outwardly from said hole engaging portions substantially in a vertical direction to abut the other of the flanges at points respectively above and below the said holes, substantially as and for the purposes set forth.

2. A safety ladder comprising angle bar stiles and a plurality of rungs, each stile having inner and outer flanges and formed with a hole in its inner flange, and each rung comprising a tread having offset bent end portions inclining outwardly from said offset portions substantially in a vertical direction to have an abutting locked relation with the inner face of the outer flange at points respectively above and below the medium line of the tread.

3. In a safety ladder, the combination of a pair of stiles and a plurality of rungs therefor, each of said stiles having inner and outer divergent flanges and formed with holes in its inner flange, one of said rungs being provided with hole-engaging portions and oppositely bent end portions disposed in an abutting relation with the inner faces of the outer flanges at each side of the ladder, and an adjacently positioned rung adapted to engage another pair of holes and having an end portion locking with the outer flange at one side of the ladder, said end portion being oppositely bent with respect to the adjacent end portion of the first mentioned rung to lock the stiles against relative movement in the plane of the ladder.

4. In a safety ladder, the combination of a pair of angle bar stiles each having holes formed in one of its divergent flanges and a pair of rungs having offset portions engaging in said holes, each rung having oppositely bent end portions extending angularly from said offset portions to engage the sides of the stiles, said end portions at one side of the ladder being bent inwardly toward each other and outwardly away from each other at the other side of the ladder to lock the rungs.

5. A ladder comprising stiles and a plurality of rungs, adjacent ends of said rungs at one side of the ladder having offset hole engaging portions and oppositely bent end portions inclining outwardly from said offset portions, and one of the stiles having divergent flanges and formed with vertically alined holes in one of its flanges through which the said offset and bent end portion are initially passed, the other flange of the stile being turnable inwardly on the offset portions to abut the said oppositely bent end portions to lock the rungs, substantially as described.

6. A car ladder comprising in combination a pair of stile members having a plurality of rung holes extending transversely therethrough; and a plurality of detachable rung members provided at each end with a bent hole-engaging portion and a rebent stile-engaging terminal portion of a size capable of being initially passed through a rung hole during assemblage of the said members; the terminal portion at one end of a rung being disposed to one side of the longitudinal axis of the rung and the other terminal portion being disposed to the opposite side thereof; said members being turnable to properly position the rung terminals when passed through the holes to bring the faces of the stiles in a plane substantially parallel with the longitudinal axes of the rungs, whereby said terminal portions engage the said faces at points respectively above and below the longitudinal axes of the rungs to lock the rungs against rotative movement.

7. A car ladder comprising in combination a pair of stile members having a plurality of rung holes extending transversely therethrough; and a plurality of detachable rung members provided at each end with a bent hole engaging portion and a rebent stile-engaging terminal portion, both portions being of a size capable of initial passage into a rung hole during assemblage of said members; the terminal portion at one end of a rung being disposed to one side of the longitudinal axis of the rung and the other terminal portion being disposed to the opposite side thereof; said ladder members being relatively turnable to properly position the rung terminals when passed through rung holes to bring the faces of the stiles in a plane substantially parallel with the longitudinal axes of the rungs whereby said terminal portions engage the said faces at points respectively above and below the longitudinal axes of the rungs to lock the rungs against rotative movement; all of said members being retained in assembled locked relation when the ladder is attached to the car.

In testimony whereof I have hereunto signed my name and affixed my signature in the presence of the two subscribed witnesses.

HERBERT DUNDERDALE.

Witnesses:
P. W. Rath,
L. J. Buttner.